Nov. 10, 1942.    H. LIST    2,301,425
ELECTRIC MACHINE
Filed March 29, 1939    4 Sheets-Sheet 1
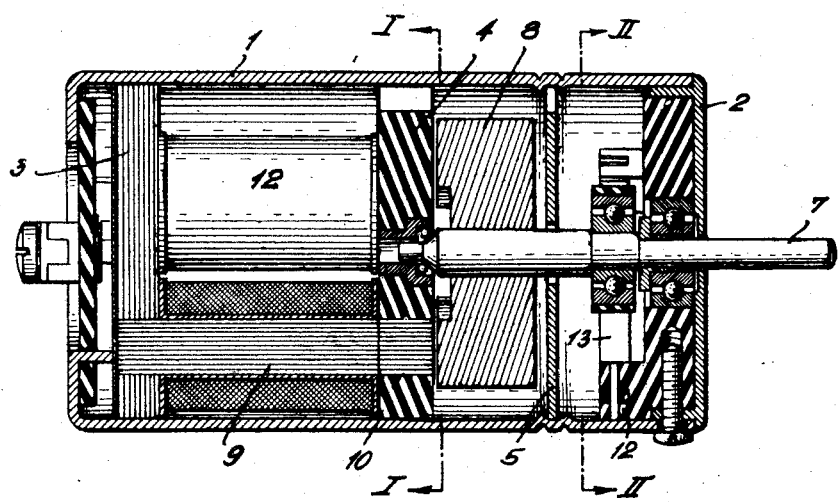
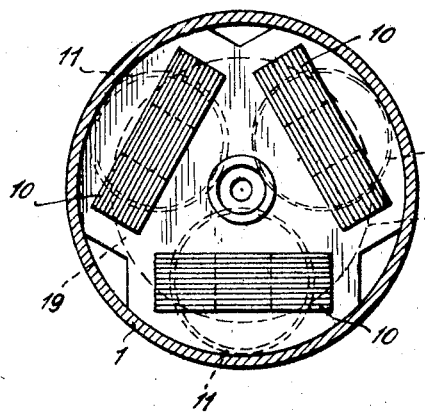
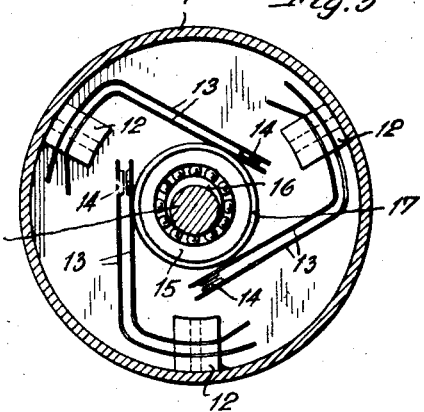
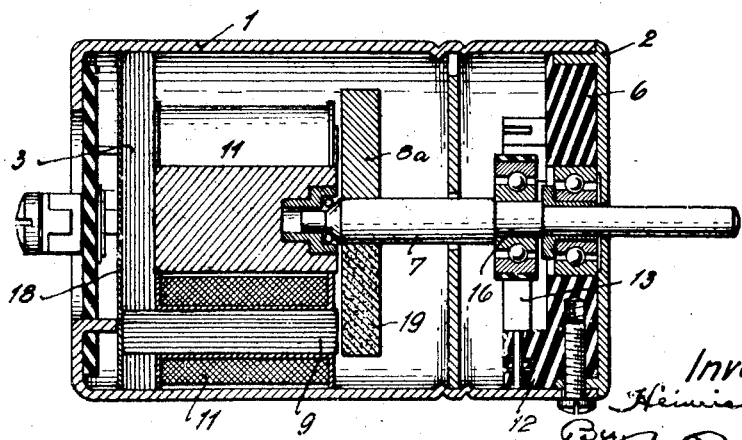

Nov. 10, 1942.   H. LIST   2,301,425
ELECTRIC MACHINE
Filed March 29, 1939   4 Sheets-Sheet 2

Inventor:
Heinrich List
By [signature]
Attorney

Nov. 10, 1942.   H. LIST   2,301,425
ELECTRIC MACHINE
Filed March 29, 1939   4 Sheets-Sheet 3
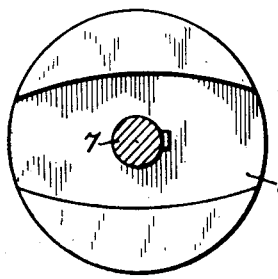
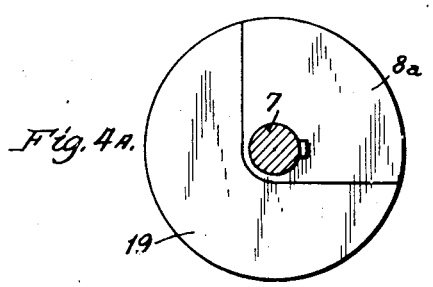
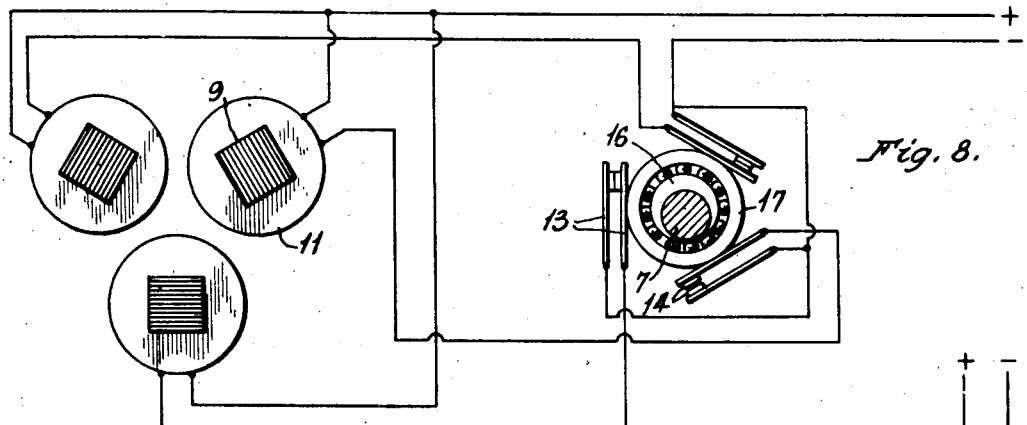
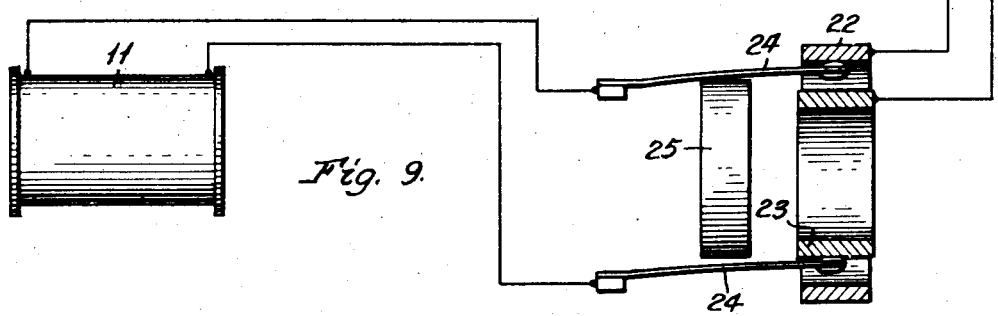
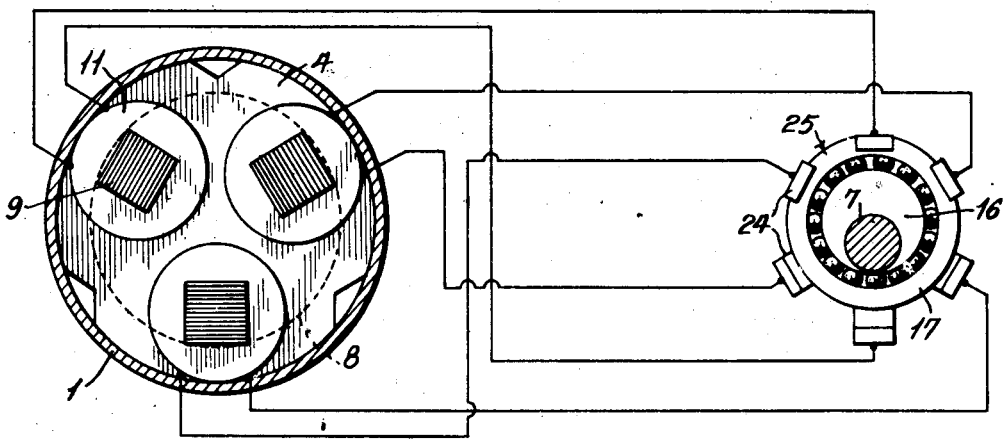
Inventor:
HEINRICH LIST.

Nov. 10, 1942.   H. LIST   2,301,425
ELECTRIC MACHINE
Filed March 29, 1939   4 Sheets-Sheet 4

Patented Nov. 10, 1942

2,301,425

UNITED STATES PATENT OFFICE 2,301,425

ELECTRIC MACHINE

Heinrich List, Berlin-Lichterfelde, Germany; vested in the Alien Property Custodian Application March 29, 1939, Serial No. 264,703
In Germany March 31, 1938

10 Claims. (Cl. 172—36)

The invention relates to an electric machine which finds principal application as a small electric motor. The machine can however be used as a current generator. The purpose of the present invention is, broadly, to provide a small direct-current-operated electric machine which has improved efficiency.

Various endeavours have been made to simplify appreciably the existing electric motor in order to create thereby a so-called small electric motor. Such small electric motors have however an extremely poor efficiency. So long as they are supplied from the mains or from large batteries the efficiency is of no significance when the relatively small consumpt of such motors is considered. However, as soon as only a dry battery is available for the operation of these motors and continuous operation is desired the heretofore known small motors fall short on account of their much too high current consumpt.

The purpose of the invention, namely to provide a small electric machine with improved efficiency, is attained by virtue of the fact that the rotor is a permanent magnet and the stator has winding-excited poles, and the excitation of the poles takes place successively in a given order by means of an improved control of the exciting current for the stator poles. This construction allows a permanent magnet armature to be incorporated in the rotor.

According to the invention the control of the exciting current for the stator poles may conveniently be effected either directly or indirectly through the intermediary of the rotation of the rotor by means of a mechanical operative connection between a current controller and the rotor. Such current controller includes switching devices constituted each by inter-contactible elements provided at fixed locations in accordance with the number and location of the stator poles and connected electrically in circuit with windings for the respective poles. The switching devices are actuated successively by rotation of the rotor by virtue of cam or eccentric means included in said operative connection. In the case of an eccentric it acts on the switching devices in such a way that one switching device commences to open only when the succeeding switching device is already closed, that is to say therefore, in such a way that the closed-contact periods which follow one another overlap. This arrangement has the particular advantage that the spark formation is small and a continuous and impulse free rotation of the rotor is obtained.

The control of the exciting current may be effected simply by offsetting eccentrically a part of the rotor shaft. On this part there rests a ball-bearing whose inner ring is free to rotate relative to the outer ring. On rotation of the shaft the ball-bearing partakes of an eccentric motion and, as a movable one of the inter-contactible elements in each switching device rests against the outer ring of the ball-bearing, movement of said elements from contacting to non-contacting positions and hence control of the exciting current is possible. Said elements are conveniently constituted by resilient tongues, not only said one element but both elements being in such case movable. Obviously the movement of the elements can take place indirectly from the eccentric. Resilient or other tongues might even bear directly on the eccentric part of the shaft provided that insulating additions on the ends of the tongues bear on the shaft.

The stator irons are normally laminated in the usual way. In one embodiment of the invention the stator irons are T-shaped and disposed with their length parallel to the axis of the rotor. The free ends of the stator irons, i. e. the ends without heads, are supported in a sheet metal packet which forms at the same time an iron flux-return-path. This sheet metal packet supports the stator irons within the preferably cylindrical housing of the machine. The enlarged heads which form the poles are supported in a transverse wall in the housing, the wall being of insulating material. These poles are presented axially to the armature of the rotor, the armature being located on the side of the insulating wall opposite from the stator irons, a first bearing for the rotor shaft being provided in said insulating wall and the switching devices are located between the rotor and a second bearing for the rotor shaft provided in the face plate of the housing. This construction of the machine makes possible very small dimensions in spite of which the individual parts are easily inspected and can be easily adjusted. An appreciable advantage of this machine is moreover the high efficiency as compared with known constructions.

The rotor's armature may be constituted as a permanent magnet with two or more poles and it is also possible to employ what may be regarded as a single-pole armature. In this case the magnetic part of the armature consists of a sector shaped plate mounted on the shaft and overlapping at least two successive stator poles. The single operative pole of this plate lies opposite the stator poles. As the sector shaped magnet occupies only a portion of a circular area the remaining part of the circular area is filled by insulating material so that there are no lateral stresses on the shaft during rotation of the rotor.

It is, for example, possible by following the mode of construction described above to produce a small motor which can be supplied for continuous operation from a small dry battery. For such small machines mechanical means known in themselves are employed in order to reduce friction. For example it is preferable to journal the shaft of the rotor in conical bearings and to balance the rotating parts satisfactorily.

If a larger number of poles is employed in the above described electric machine then the current controller for the stator poles may consist of two fixed contact rings which are arranged concentrically with one another and between which a certain clearance is left. Into this clearance project the ends of contact tongues which are arranged in accordance with the number and position of the stator poles. These contact tongues are controlled by a common eccentric or the like and bear alternately on the outer or the inner contact ring. This arrangement has, moreover, the especial advantage that complete interruption of the current does not occur. On the contrary the current flows continuously through the exciting windings of the stator.

The improved efficiency of the electric machine described above is principally a consequence of the mode of construction of the stator. It is possible without difficulty to observe the most favourable relationship between the length of a coil and its winding height. In this way there follows the most favourable use of the copper winding and the greater part of the iron circuit is enclosed. There are no considerable superfluous iron bodies; on the contrary, in the construction visualised above only so much iron is used as is necessary. The electric and magnetic losses are therefore reduced to a minimum.

Embodiments of the invention are illustrated, by way of being examples of the invention, in the accompanying drawings:

Fig. 1 showing a longitudinal section through one embodiment.

Fig. 2 is a cross section on the line I—I of Figure 1 and Fig. 2A is an end view of the rotor as seen in the direction opposite to Fig. 2.

Figure 3 is a cross section on the line II—II of Figure 1.

Figure 4 is a longitudinal section of a further embodiment and Fig. 4A is an end view of the rotor.

Fig. 8 is a wiring diagram of the excitation circuit of any of the modifications according to Figs. 1 to 7.

Figs. 9 and 10 are diagrammatic views of a current reversing controller applicable to any of the modifications according to Figs. 1 to 7 instead of the controllers therein shown.

Figure 5:
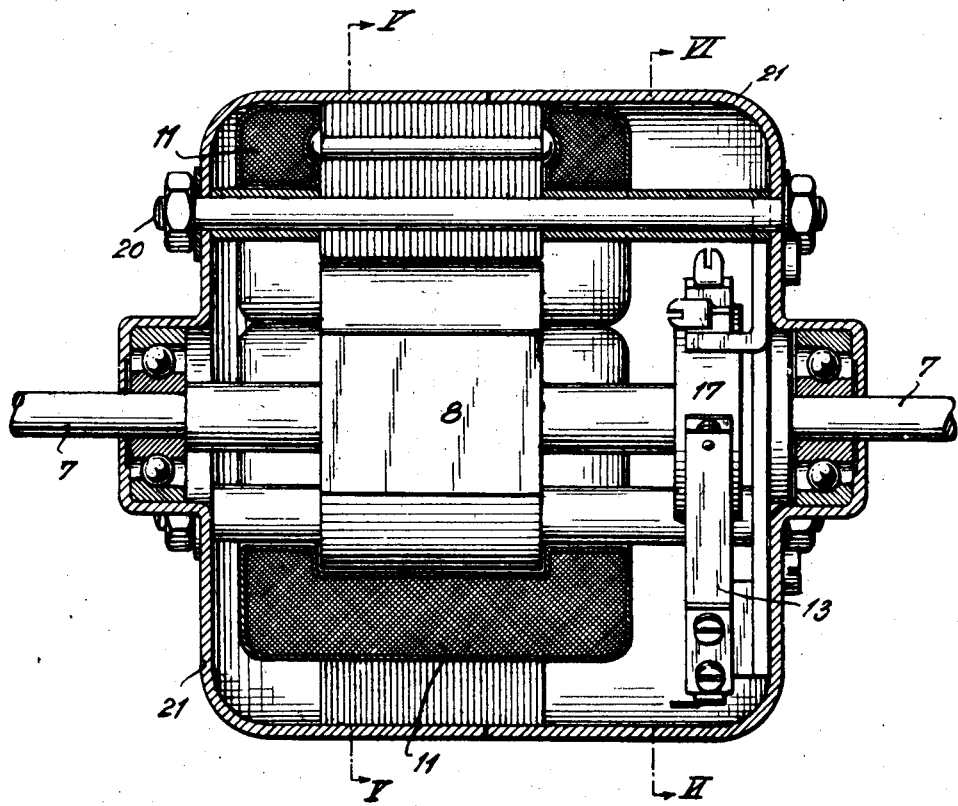
Figure 5 is a longitudinal section of a further embodiment.

Referring to the drawings:

In Figures 1 to 3 numeral 1 designates a cylindrical housing which is closed by a removable cover 2. The interior of the housing is divided by three partitioning walls 3, 4 and 5, and an insulating plate 6 is supported on the inner surface of the cover 2. In the plate 6 and the wall 4, which likewise consists of insulating material, the ball-bearings for a shaft 7 are provided. An armature 8 (Figs. 1 and 2A) is fixed to the shaft 7 and these parts together constitute the rotor. The armature carries no windings but consists of steel with a high coercive force and magnetised to constitute a permanent magnet with, in this particular case, two poles. The partitioning wall 3 is formed of laminated iron and constitutes a base plate for the stator and an iron flux-return-path. In this wall there are secured in this embodiment three stator irons 9, constituting pole bodies, which uniformly spaced around the periphery of the housing are disposed parallel to the shaft 7. The stator irons are enlarged towards the ends directed to the rotor so that poles 10 are formed presented to the armature. Most simply the poles are produced by giving the stator irons a T-shape and supporting the T-heads in the partitioning wall 4. The stator irons are, like the wall 3, laminated. On each stator iron is provided an exciting winding 11.

The current-controller for the exciting current for the winding 11 derives support from projections 12 of the plate 6. Each switching device in the current controller consists of two resilient tongues 13 having contact pieces 14 and constituting inter-contacting elements. The tongues 13 are so adjusted that in their undisturbed setting the contacts 14 do not touch. The number and position of the devices 13, 14 conform with the stator poles 10. Each switching device is connected, as Fig. 8 shows, with the corresponding exciting winding 11 and with the source of current in such a way that when contacts 14 touch direct current from the terminals of the machine flows through the corresponding winding 11 and a particular polarity is impressed on the corresponding pole 10.

The actuation of the devices 13, 14 in this case is effected in succession by a ball-bearing 15 which is provided on an eccentric portion 16 of the shaft 7. The inner ring of the ball-bearing is free to rotate relatively to the outer ring 17 and therefore the outer ring on rotation of the shaft 7 partakes, together with the eccentric part, of a swinging movement, and as one tongue of each set of tongues 13, 14 bears against the outer ring 17 it is thus that the switching devices are one after the other closed and then opened. Correspondingly the stator poles are successively excited and the exciting current then switched off. In this way a kind of rotating field is produced in the region of the armature by means of a direct current and by the interaction of the successively excited stator poles 10 and the poles of the permanent magnet 8 the rotor is maintained in rotation.

The eccentric means for actuating the current-controller may be regarded as a part rotatable with the rotor and having a zone of increased radius whose angular extent, limited by the minimum radius which will close the tongues of the switching devices, is at least equal to the angular distance between two successive switching devices.

In the embodiment according to Figs. 4 and 4A a permanent magnet 18 is arranged in the middle of the stator base plate 3 which magnet gives to the poles of the stator irons a given polarity which is periodically strengthened or weakened by means of the exciting current. A "single pole" armature 8a is employed which is sector shaped and preferably overlaps two stator poles. The remaining circular area is filled by a sector 19 of non-magnetic material. The mode of operation is the same as in the embodiment described above.

Figure 6:
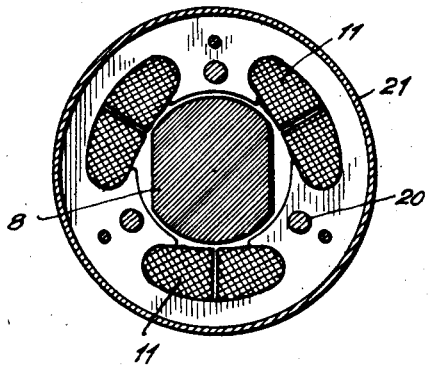
Figure 6 is a cross section, to a reduced scale, on the line V—V of Figure 5.
Figure 7:
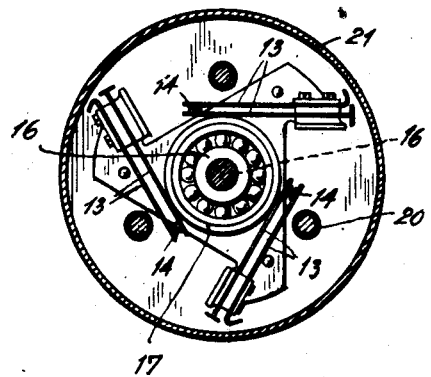
Figure 7 is a cross section, also to a reduced scale, on the line VI—VI of Figure 5.

Whereas Figures 1 to 4 show an electric machine in which the stator and armature lie one behind the other in the direction of the shaft in Figures 5 to 7 there is to be seen a machine in which the armature is disposed within the stator as in the conventional motors. The corresponding parts carry the same reference numerals as in the other embodiments. The housing consists of two parts 21 held together by screw bolts 20. The concentric arrangement of the rotor and stator necessitates a special coil shape as shown in Figures 5 and 6 by means of which a further increase of the efficiency of the machine is attained.

The current-controller according to Figs. 9 and 10 consists of two fixed concentric rings 22 and 23 between which are arranged resilient tongues 24 in accordance with the number and position of the poles and which are actuated by an eccentric 25 in order to supply current to the windings of the stator poles. In Fig. 9 the wiring from the supply to the current controller and thence to only a single coil 11 is given, all of the coils being however electrically connected identically to one another except as regards angular relationship. This relationship will be clear from Fig. 10, which shows the connections from all the pairs of tongues 24 (conventionally represented) to the respective coils 11. In these Figs. 9 and 10, parts associated with the parts 22 to 25 have been given the same reference numbers as corresponding parts in Figs. 1 to 8. This arrangement works as a current reverser so that all the poles are almost continuously excited. The efficiency of the machine is thereby increased and on a load basis the weight and the dimensions are reduced.

Figure 11:
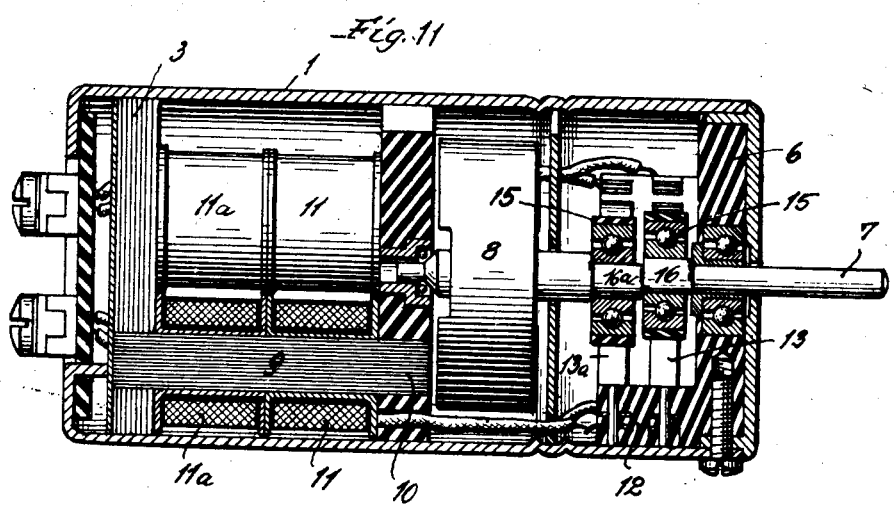
Fig. 11 is a longitudinal section through a machine comprising a motor-driven generator.

Referring to Fig. 11, in the construction therein shown two sets of coils 11 and 11a are arranged on the stator iron 9. The coil set 11 is, as described with reference to Figure 1, connected to the source of direct current and to the current-controller 13 in order to impress periodically a given polarity on the poles 10. By virtue of this continuing change in the polarity of the stator poles and the rotating magnet-armature 8 an alternating or reversing current is generated in the coils 11a. The current generated in the coils 11a is led to the terminals by way of a current-distributor including tongues 13a and generally similar to the current-controller 13. The arrangement is such that the current is sent from the machine in one direction by means of this distributor as by means of a commutator. The shaft 7 has a second eccentric part 16a on which a ball-bearing 15a undergoes a swinging movement and thereby moving the tongues 13a actuates the current distributor.

By means of a motor-driven generator such as shown in Figure 11 it is possible for example to drive by a 4 volt battery and take from the terminals of the generator part a direct current potential of 100 volts and, for example, use it for an anode current circuit.

I claim:

1. An electric machine comprising a stationary structure, a continuously rotatable structure incorporating a permanent magnet armature, a plurality of pole bodies incorporated in the stationary structure and presenting to said armature a plurality of poles at angularly spaced positions with reference to the axis of rotation of the rotatable structure, windings applied to said pole bodies there being a winding for each pole body, a current-controller connected electrically in circuit with said windings, an eccentric on the rotatable structure and a ring journalled on the eccentric to actuate said current controller under the control of said eccentric, the current-controller being adapted on actuation to allow current to be supplied to said windings successively to impress a like polarity on said poles successively.

2. An electric machine comprising a stationary structure, a continuously rotatable structure incorporating a permanent magnet armature, a plurality of pole bodies incorporated in the stationary structure and presenting to said armature a plurality of poles at angularly spaced positions with reference to the axis of rotation of the rotatable structure, windings applied to said pole bodies there being a winding for each pole body, means for supplying direct current to said windings, a current-controller consisting of sets of intercontactible elements there being a set of such elements connected electrically in circuit with the winding for each pole body, a freely rotatable ring against which bears a movable one of said elements in each set, a circular mounting for said ring, the mounting being carried by said rotatable structure and being eccentrically offset with reference to the axis of rotation of said structure, and anti-friction rolling members between said ring and said mounting, said ring on rotation of said rotatable structure imparting movement to said said movable element in each of the sets successively so as to allow direct current to be supplied to said windings successively.

3. An electric machine comprising a stationary structure, a continuously rotatable structure incorporating a permanent magnet armature and a shaft on which said armature is mounted, a plurality of pole bodies incorporated in the stationary structure and presenting to said armature a plurality of poles at angularly spaced positions with reference to the axis of rotation of the rotatable structure, windings applied to said pole bodies there being a winding for each pole body, a current controller consisting of sets of intercontactible elements resiliently urged to assume non-contacting position, there being a set of such elements connected electrically in circuit with the winding for each pole body and the sets being mounted at fixed locations on the stationary structure which locations are angularly spaced by amounts corresponding to the angular spacing of the poles of the respective pole bodies, an inner ring fast on an eccentrically offset portion of said rotatable structure's shaft, an outer ring freely-rotatably mounted on said inner ring, anti-friction rolling members between said outer and inner rings, a movable one of said elements in each current-controller set which element bears against said outer ring, whereby on rotation of said shaft the elements of the current-controller sets are caused to assume inter-contacting positions once per revolution of said shaft.

4. An electric machine comprising a stationary structure including a housing, a continuously rotatable structure incorporating a permanent magnet and a shaft on which said armature is mounted, a plurality of elongated pole bodies incorporated in said stationary structure disposed at angularly spaced positions with reference to the axis of rotation of said rotatable structure and each with its length parallel to said axis, the pole bodies being located on one axially facing side of said armature and the pole bodies having their one ends adjacent said armature side, enlarged pole-forming heads on said ends, an insulating mounting supporting said ends, a laminated iron mounting supporting the other ends of said pole bodies, said insulating mounting and said laminated-iron mounting each being constituted as a transverse partitioning wall in said housing, a bearing for the armature's shaft on said insulating mounting, a second bearing for said shaft on the housing and at the opposite axially-facing side of the armature from said pole bodies, windings applied around said pole bodies there being a winding for each pole body with its axis parallel to the length thereof, means for supplying direct current to said windings, a current controller between said armature and said second bearing, said current-controller consisting of sets of inter-contactible elements resiliently urged to assume non-contacting positions, there being a set of such elements connected electrically in circuit with the winding for each pole body and the sets being mounted at fixed locations on the stationary structure which locations are angularly spaced by amounts corresponding to the angular spacing of the poles of the respective pole bodies, an inner ring mounted fast on an eccentrically offset portion of said shaft which portion is located between said armature and said second bearing, an outer ring freely-rotatably mounted on said inner ring, anti-friction rolling members between said outer and inner rings, a movable one of said elements in each current-controller set which element bears against said outer ring, whereby on rotation of said shaft the elements of the current-controller sets are caused to assume inter-contacting positions once per revolution of said shaft.

5. An electric machine comprising a stationary structure including a housing, a continuously rotatable structure, at least three elongated pole bodies incorporated in said stationary structure disposed at angularly spaced positions with reference to the axis of rotation of said rotatable structure and each with its length parallel to said axis, a disc-like member and shaft therefor incorporated in the continuously rotatable structure, the disc like member being located with one axially-facing side adjacent the one end of said pole bodies and consisting of two complementary sector shaped components whereof one is constituted by a permanent magnet of less than semi-circular area and whereof the other is constituted by insulating material, an iron-mounting supporting the other ends of said pole bodies, windings applied around said pole bodies, there being a winding for each pole body with its axis parallel to the length thereof, a permanent magnet incorporated in the stationary structure co-axial with said rotatable structure and with an end adjacent said disc-like member's side and another end supported on said iron mounting, a bearing for said shaft on the stationary structure's permanent magnet, a second bearing for said shaft on the housing and at the opposite axially-facing side of the disc-like member from said pole bodies, means for supplying direct current to said windings, a current controller consisting of sets of inter-contactible elements resiliently urged to assume non-contacting positions, there being a set of such elements connected electrically in circuit with the winding for each pole body and the sets being mounted at fixed locations on the stationary structure which locations are angularly spaced by amounts corresponding to the angular spacing of the poles of the respective pole bodies, an inner ring fast on an eccentrically offset portion of said shaft which portion is located between said disc-like member and said second bearing, an outer ring freely-rotatably mounted on said inner ring, anti-friction rolling members between said outer and inner rings, a movable one of said elements in each current-controller set which element bears against said outer ring, whereby on rotation of said shaft the elements of the current-controller sets are caused to assume inter-contacting positions once per revolution of said shaft.

6. An electric machine comprising a stationary structure, a continuously rotatable structure incorporating a permanent magnet armature, a plurality of pole bodies incorporated in the stationary structure and presenting to said armature a plurality of poles at angularly spaced positions with reference to the axis of rotation of the rotatable structure, windings applied to said pole bodies there being a winding for each pole body, means for supplying direct current to said windings, a current-controller connected electrically in circuit with said windings, the current-controller consisting of outer and inner spaced concentric contact-rings and resilient-contact elements projecting between said contact rings, and an eccentric-like member rotatable with said rotatable structure and bearing on said resilient contact-elements, said member on rotation of said rotatable structure oscillating the contact elements from positions of contact with one of said contact rings to positions of contact with the other of said contact rings thereby actuating said current controller, the current controller being adapted on actuation to reverse the direction of current in the coils successively and thereby create a rotating magnetic field.

7. An electric machine comprising a stationary structure, a continuously rotatable structure incorporating a permanent magnet armature, a plurality of pole bodies incorporated in the stationary structure and presenting to said armature a plurality of poles at angularly spaced positions with reference to the axis of rotation of the rotatable structure, windings applied to said pole bodies there being a winding for each pole body, a positive lead and a negative lead for supplying direct current to said winding, a current-controller connected electrically in circuit with said windings, the current-controller consisting of fixed outer and inner spaced concentric contact-rings connected the one to said positive lead and the other to said negative lead and pairs of movable contact-elements to contact with said rings there being a pair of elements for each winding connected to the respective ends thereof, and means on the rotatable structure acting on the contact elements to move them from positions of contact with one of said contact rings to positions of contact with the other said contact rings, the said means acting on rotation of the rotatable structure simultaneously on the elements of a pair and successively on the pairs of elements and constraining the elements of a pair to contact with different contact rings.

8. In an electric machine comprising a stator, electro-magnets on the stator, a rotor incorporating an armature for the magnets, electric connections from the magnets to a source of exciting current and contacts in said connections, the combination of an eccentric on said rotor to rotate therewith and a ring freely journalled on said eccentric and operatively associated with said contacts to close and open them and thus excite the magnets sequentially under the control of said eccentric.

9. In an electric machine comprising a stator, angularly spaced electro-magnets on the stator, a rotor incorporating an armature for the magnets, electric connections from the magnets to a source of exciting current and pairs of contacts mounted on the stator and interposed in said connections, the combination of an eccentric on said rotor to rotate therewith, a ring surrounding said eccentric, a roller-bearing between said ececntric and ring, and members angularly spaced similarly to the magnets and mounted on the stator so as to bear upon said ring, said members each being connected to one contact of each of said pairs of contacts so as to close and open them and thus excite the magnets sequentially under the control of said eccentric.

10. In an electric machine comprising a stator, angularly spaced electro-magnets on the stator, and a rotor incorporating a permanent magnet which constitutes an armature for the magnets, the combination of movable contact elements angularly spaced similarly to the magnets, there being one of said elements for each magnet, stationary contact elements engageable one at a time by the individual movable contact elements, all of said contact elements being interposed between electric terminals of different polarity and the respective magnets, an eccentric on said rotor, and a ring freely journalled on said eccentric and operatively associated with said movable contact elements to move them under the control of said eccentric from one to the other of said stationary contact elements in order to sequentially energise and keep reversing the polarity of the magnets.

HEINRICH LIST.